United States Patent [19]

Vaslin

[11] Patent Number: 5,284,083
[45] Date of Patent: Feb. 8, 1994

[54] SYSTEM FOR POWERING THE DRIVING ACTUATOR OF AN AIRCRAFT UNDERCARRIAGE

[75] Inventor: Jean-Philippe Vaslin, Montigny-le-Bretonneux, France

[73] Assignee: Messier-Bugatti, Velizy-Villacoublay, France

[21] Appl. No.: 979,256

[22] Filed: Nov. 20, 1992

[30] Foreign Application Priority Data

Nov. 26, 1991 [FR] France .................. 91 14574

[51] Int. Cl.$^5$ .................. F01B 25/02; F16D 31/02
[52] U.S. Cl. .................. 91/19; 91/20; 91/459; 91/462; 60/406; 60/494
[58] Field of Search ............ 60/403, 406, 470, 494; 91/459, 19, 20, 22, 23, 24, 25, 26, 27, 28, 29, 462, 466, 449, 437, 442

[56] References Cited

U.S. PATENT DOCUMENTS

| | | | |
|---|---|---|---|
| 1,073,954 | 9/1913 | Burns | 91/22 |
| 1,905,065 | 4/1933 | Scholl | 91/26 |
| 2,657,533 | 11/1953 | Schanzlin | 60/406 |
| 3,054,383 | 9/1962 | Hanna | 91/24 |
| 3,082,746 | 3/1963 | Kerridge | 91/405 |
| 3,470,792 | 10/1969 | Darling | 91/396 |
| 3,472,127 | 10/1969 | Scheidt | 91/437 |
| 3,559,535 | 2/1971 | Conolly | 91/26 |
| 3,908,515 | 9/1975 | Johnson | 91/437 X |
| 5,079,492 | 1/1992 | Takagi | 91/459 X |

FOREIGN PATENT DOCUMENTS

| | | | |
|---|---|---|---|
| 2355593 | 5/1975 | Fed. Rep. of Germany | 91/26 |
| 234603 | 3/1988 | Japan | 91/22 |
| 647211 | 2/1948 | United Kingdom | |
| 2079378 | 1/1982 | United Kingdom | 91/437 |

*Primary Examiner*—Edward K. Look
*Assistant Examiner*—Hoang Nguyen
*Attorney, Agent, or Firm*—Sixbey, Friedman, Leedom & Ferguson

[57] ABSTRACT

The invention relates to a system for powering the driving actuator of an aircraft undercarriage, the system including a hydraulic generator capable of delivering fluid under pressure to one or the other of two chambers of the driving actuator. According to the invention, the power supply system includes a safety device enabling any overloading of the actuator rod under the effect of pressure peaks to be avoided: said device comprises two pressure relief valves, the first valve limiting the pressure delivered to the annular chamber and being under the control of the pressure in the full-section chamber, and the second pressure relief valve being of the differential type and continuously controlling the pressure difference between the two chambers of the actuator. The invention is applicable to providing very safe power supply systems for aircraft undercarriages.

7 Claims, 1 Drawing Sheet

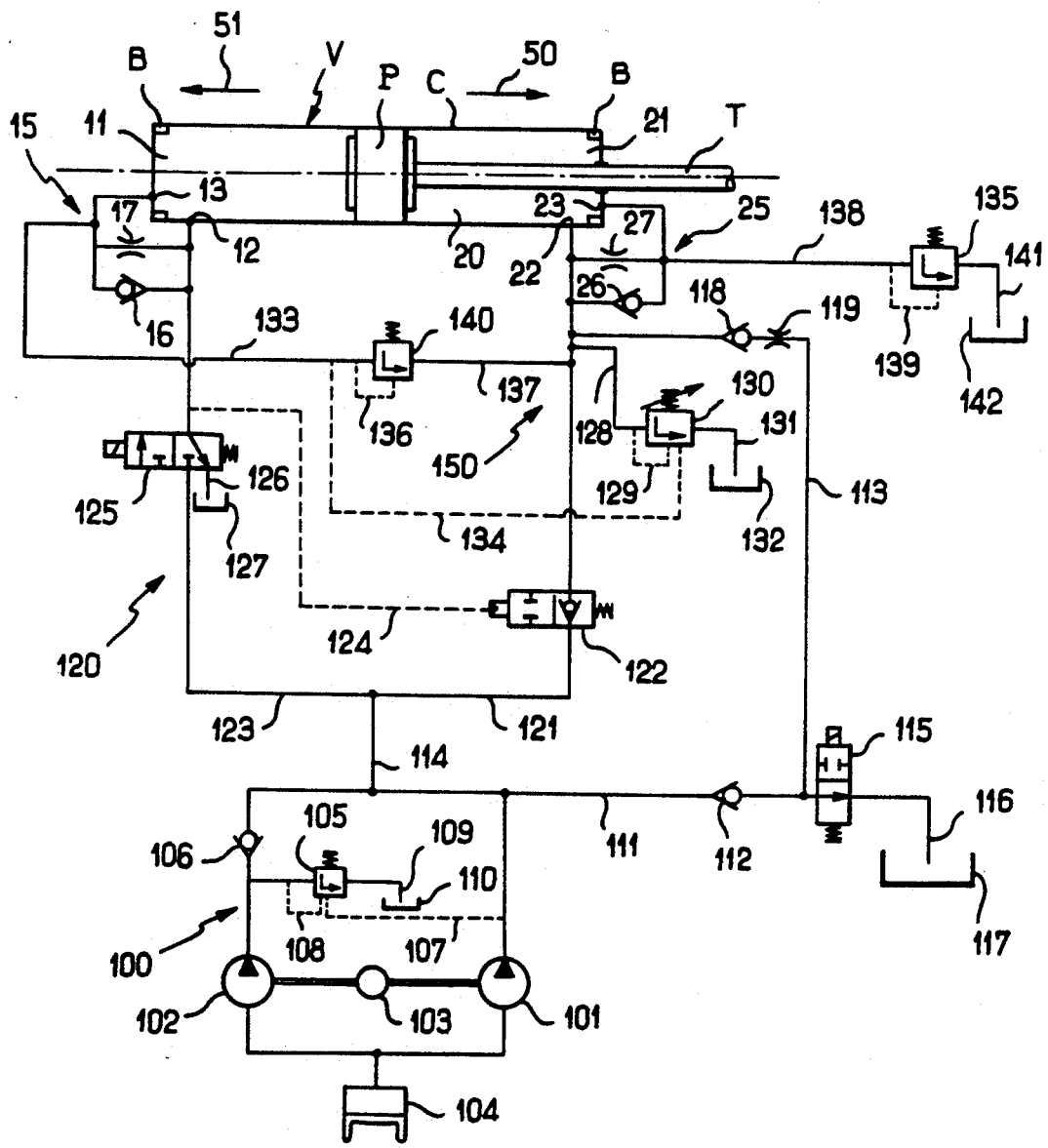

SYSTEM FOR POWERING THE DRIVING ACTUATOR OF AN AIRCRAFT UNDERCARRIAGE

The invention relates to powering the actuators that drive aircraft undercarriages, and more particularly power systems of the type including a hydraulic generator capable of delivering fluid under pressure to the annular chamber of the driving actuator to raise the undercarriage, or to the full-section chamber of said actuator to lower the undercarriage.

BACKGROUND OF THE INVENTION

Known power systems generally include damping members that act when the piston reaches an end-of-stroke region, both at the end of raising the undercarriage and at the end of lowering it. The actuators also include end-of-stroke dampers having pressure-control valves.

Nevertheless, under certain situations, the rod of the actuator can be subjected to high stresses. This applies, for example, at the end of a raising operation where the inertia of the undercarriage, together with the increase of pressure obtained in the end-of-stroke damping chamber and the driving force in the annular chamber generate high compression forces on the actuator rod. These forces are taken into account when dimensioning the actuator. Furthermore, when the undercarriage is lowered, it is desired to implement a sequence comprising, in succession: pressurizing the annular chamber, releasing the mechanical latch, and pressurizing the full section chamber, while simultaneously avoiding pressure peaks in the annular chamber.

The problem of the invention sets out to solve is that of designing a power system capable of avoiding the actuator rod being subjected to dangerous stresses, in particular at the end of raising the undercarriage.

Another object of the invention is to provide a power system whose structure is both simple and extremely reliable, and which can easily be added to existing installations.

Another object of the invention is to design a power system enabling pressure peaks to be avoided in the annular chamber of the actuator when lowering the undercarriage, and consequently making it possible to obtain a saving on the dimensioning of the actuator cylinder, and which also allows the undercarriage to be lowered in an emergency in the event of the hydraulic generator failing.

SUMMARY OF THE INVENTION

More particularly, the present invention provides a system for powering the driving actuator of an aircraft undercarriage, the system comprising a hydraulic generator capable of delivering fluid under pressure to the annular chamber of the driving actuator to lift the undercarriage, or to the full-section chamber of said actuator to lower the undercarriage, wherein the system includes a safety device for avoiding overloading the rod of the driving actuator under the effect of pressure peaks, said device comprising two pressure relief valves, of which a first pressure relief valve limits the pressure delivered to the annular chamber and is also under the control of the pressure that exists in the full-section chamber so as to cause the pressure in said annular chamber to drop, and of which a second pressure relief valve is of the differential type and continuously controls the pressure difference between the two chambers of the actuator.

Preferably, the two pressure relief valves are included in a circuit that further includes first end-of-stroke damping means associated with the full-section chamber so that at the end of raising the undercarriage it controls both the slowing down of the rod and the pressure drop in the terminal portion of said chamber associated with said damping means. In particular, the first damping means include a restriction and a non-return valve and serve to control the end-of-stroke speed of the rod after it has slowed down.

Also advantageously, the circuit further includes second end-of-stroke damping means associated with the annular chamber for the purposes at the end of undercarriage lowering both of controlling the slowing down of the rod and of controlling the pressure drop in the end portion of said chamber associated with said damping means. In particular, the second damping means include a restriction and a non-return valve, and serve to control the end-of-stroke speed of the rod after it has slowed down.

It is also advantageous for a third pressure relief valve to be associated with the second damping means in order to limit the pressure existing in the end portion of the annular chamber when lowering the undercarriage.

Also preferably, the power system further includes an electrically controlled directional control valve associated with the hydraulic generator firstly to enable said hydraulic generator to be started up under low load, with said electrically controlled valve then being excited so as to direct fluid under pressure to one or other of the chambers of the actuator, and secondly to enable the undercarriage to be lowered in an emergency in the event of the hydraulic generator failing, said electrically controlled valve then being at rest. It is then advantageous for the line associated with emergency lowering of the undercarriage for conveying the fluid from the annular chamber to the electrically controlled valve at rest, to include both a non-return valve and a restriction to control the speed at which the undercarriage is lowered.

BRIEF DESCRIPTION OF THE DRAWING

An embodiment of the invention is described by way of example with reference to the accompanying drawing, in which the sole FIGURE is a diagram showing the structure and the organization of a power system in accordance with the invention.

DETAILED DESCRIPTION

The sole FIGURE shows a driving actuator V for an aircraft undercarriage, the actuator rod being referenced T and its piston P. The undercarriage connected to the rod T is not shown, but the FIGURE does include an arrow 50 representing the undercarriage lowering direction and an arrow 51 representing the undercarriage raising direction. The chamber of the actuator V that surrounds the rod T is referenced 20, which chamber is referred to below as the "annular" chamber, and is the chamber to which fluid under pressure is applied to raise the undercarriage. The other chamber is referenced 10 and is referred to below as the "full-section" chamber, receiving fluid under pressure for lowering the undercarriage. In conventional manner, the cylinder C of the driving actuator V includes through orifices 12 and 22 giving access to the chambers 10 and 20, and smaller orifices referenced 13 and 23 located in the ends of the cylinder and being concerned when the piston P reaches the end of its stroke in one or other of the two chambers of the actuator. The terminal portion of the full section chamber 10 (referenced 11) and the terminal portion of the annular chamber 20 (referenced 21) thus constitute damping chambers in the actuator. Finally, there can be seen abutments B associated with the piston P of the driving actuator.

The system for powering the driving actuator includes a hydraulic generator 100 capable of delivering fluid under pressure to the annular chamber 20 of the driving actuator V in order to raise the undercarriage, or to the full-section chamber 10 of said actuator in order to lower the undercarriage. The hydraulic generator 100 shown in the FIGURE includes a low pressure stage and a high pressure stage, said stages being interconnected by a cutout valve enabling the low pressure stage to be short circuited when the load downstream from the hydraulic generator exceeds a predetermined threshold.

This type of hydraulic generator is already known so its component parts are described only briefly.

The hydraulic generator 100 thus comprises a high pressure pump 101 and a low pressure pump 102 both driven by an electric motor 103 and connected to a pressurized hydraulic fluid tank 104. At the outlet from the low pressure pump 102, there is the hydraulic cutout valve 105 with its damping loop 108, and its control line is represented by dashed line 107 while its outlet 109 leads to a fluid tank 110. The dashed line 107 recalls that the hydraulic cutout valve 105 is controlled by the pressure of the hydraulic fluid at the outlet from the high pressure pump 101. Finally, the circuit is looped by a non-return valve 106. Under normal conditions, such a hydraulic generator operates with both stages, while under more severe conditions, it operates using the high pressure stage only. By way of example, a high pressure pump may be provided which is capable of delivering up to $350 \times 10^5$ Pa, and a low pressure pump capable of delivering up to $215 \times 10^5$ Pa. Thus, when raising the undercarriage, a pressure of $215 \times 10^5$ Pa generally suffices for raising the undercarriage in a time of about 10 seconds, such that the generator then operates with both pressure stages, its high pressure pump delivering no more than $215 \times 10^5$ Pa. If raising conditions become more severe, then the high pressure pump delivers pressure greater than $215 \times 10^5$ Pa, thereby causing the hydraulic cutout valve 105 to be operated so that the fluid delivered by the low pressure stage is then conveyed to the fluid tank 110. The high pressure stage can then deliver pressure up to $350 \times 10^5$ Pa to drive the undercarriage under particularly difficult raising conditions, with the fluid delivered by the high pressure stage then making it possible to raise the undercarriage in a time of about 20 seconds.

In accordance with an essential aspect of invention, the power system includes a safety device 150 that seeks to avoid overloading the rod T of the driving actuator V under the effect of pressure peaks, said device comprising two pressure relief valves 130 and 140 which are organized so that the first pressure relief valve 130 limits the pressure delivered to the annular chamber 20 and is also controlled by the pressure that exists in the full-section chamber 10 so as to cause the pressure that exists in the said annular chamber to drop, while the second pressure release valve 140 is of the differential type and continuously controls the pressure difference that exists between the two chambers 10 and 20 of the actuator V.

The function of each of the above-mentioned pressure relief valves 130 and 140 will be better understood when the operation of the power system of the invention is described, both for raising the undercarriage and for lowering it. Before describing said operation, the various component parts of the circuit 120 in which the safety device 150 is integrated are described, although the organization of this circuit is given purely by way of illustration.

The circuit 120 is connected by a line 114 to the hydraulic generator 100, which line has a first branch 121 leading to the annular chamber 20 of the actuator via a controlled valve 122, and a second branch 123 leading to the full-section chamber 10 of said actuator via an electrically-controlled directional control valve 125. The valve 122 is shown in its rest position, which corresponds to allowing one-way flow of hydraulic fluid towards the annular chamber 20. This position corresponds to raising the undercarriage. In this situation, the valve 125 is in its non-excited state in which it is capable of directing hydraulic fluid coming from the full-section chamber 10 into a fluid tank 127 via line 126. In contrast, when the valve 125 is excited, the hydraulic fluid can pass via the branch 123 to go towards the full-section chamber 10, and it is the control of the valve 122 as represented by dashed line 124 that excites said valve to bring it to a non-through position. This second position for the electrically-controlled valve 125 and for the hydraulically-controlled valve 122 corresponds to lowering the undercarriage.

The two pressure relief valves 130 and 140 are included in the above-described circuit 120 as described below.

The first pressure relief valve 130 is connected by a line 128 to above-mentioned branch 121, and when open, said relief valve delivers hydraulic fluid via a line 131 into a tank 132. The pressure relief valve 130 can thus act as a pressure limiter when no control is applied to it, limiting the pressure delivered by the hydraulic generator 100 to the annular chamber 20 of the actuator. For example, the corresponding rating may be set to a value of about $350 \times 10^5$ Pa. This first function is represented by dashed line 129. As represented by dashed line 134, the pressure relief valve 130 is in addition controlled by the pressure that exists in the full-section chamber 10 via the orifice 13 through the actuator cylinder and the corresponding line 133 that leads to the second pressure relief valve 140. This control on the first pressure relief valve 130 takes place while the undercarriage is being raised and when the piston is close to the end of the corresponding stroke (i.e. when the orifice 12 is masked, so that the full-section chamber is then reduced to its terminal portion or damping chamber 11). Under such circumstances, when the pressure in the damping chamber 11 reaches a predetermined threshold (which threshold is well below $350 \times 10^5$ Pa so that release occurs quickly), said pressure has the effect of releasing the pressure relief valve 130, thus causing the pressure in the annular chamber 20 of the driving actuator to drop. While the undercarriage is being lowered, a similar situation occurs for the first pressure relief valve 130 with control via control line 134 because of the pressure increase in the full-section chamber 10. Under such circumstances, the first pressure relief valve 130 is then released, which puts the annular chamber 20 of the actuator into communication with the associated fluid tank 132.

The second pressure relief valve 140 receives firstly the pressure from the line 133 which is associated with the full-section chamber of the actuator, and secondly the pressure from a line 137 which is connected to the branch 121 leading to the annular chamber 20 of said actuator. A damping loop 136 is associated in conventional manner with the second pressure relief valve 140 to damp its return to the closed position.

Unlike the first pressure relief valve 130, the second pressure relief valve 140 is of the differential type, i.e. it allows fluid to pass automatically as soon as a predetermined pressure difference arises across said valve. The second pressure relief valve 140 therefore serves to control the pressure difference that exists between the two chambers 10 and 20 of the actuator V on a continuous basis and, because it is connected to the branch 121 of the circuit, it delivers fluid to the tank 132 via the first pressure relief valve 130. Controlling the pressure difference between the two chambers of the actuator is particularly advantageous towards the end of the undercarriage-raising stroke, but it is also advantageous when lowering the undercarriage while the pressure in the full-section chamber is increasing.

It is also advantageous for the circuit 120 containing the two pressure relief valves 130 and 140 to include end-of-stroke damping means 15 associated with the full-section chamber 10 so that at the end of raising the undercarriage both the slowing down of the rod T of the rising actuator, and the pressure drop in the terminal portion 11 of the full-section chamber 10 associated with said damping means are under control. As in conventional technology, these damping means 15 include a restriction 17 enabling the end-of-stroke speed of the rod T to be controlled after it has slowed down, and a non-return valve 16 which enables the end-of-stroke damping chamber to be filled without going through the above-mentioned restriction.

In similar manner, the circuit 120 also includes second end-of-stroke damping means 25 associated with the annular chamber 20 so that at the end of lowering the undercarriage, both the slowing down of the rod T, and the drop of pressure in the terminal portion of said annular chamber associated with said damping means are under control. These second damping means 25 include, like the first damping means 15, a restriction 27 and a non-return valve 26, thereby enabling the end-of-stroke speed of the rod T to be controlled after it has slowed down.

When lowering the undercarriage, it is also advantageous to provide a third pressure relief valve 135 associated with the second damping means 25 so as to limit the pressure that exists in the end portion 21 of the annular chamber 20. As shown in the FIGURE, this third pressure relief valve 135 is connected to the circuit of the damping means 25 via a branch 138, control of said valve being represented by dashed line 139, and the outlet from said valve going to a hydraulic fluid tank 142 via an outlet line 141.

In practice, the various above-mentioned tanks (tanks 110, 119, 127, 132, and 142) are all constituted by the pressurized tank 104 which then constitutes a common tank of hydraulic fluid.

It is also advantageous for the power system further to include an electrically-controlled directional control valve 115 associated with the hydraulic generator 100 so as to enable said hydraulic generator to start up under low load. The valve 115 shown in the figure is connected to the hydraulic generator 100 by a line 111, via a non-return valve 112, and the outlet from said valve 115 goes to a hydraulic fluid tank 117 via a line 116. When at rest, the valve 115 is open (with the open position being that shown in the figure), and it is closed when the operator actuates an associated electronic or electrical control. It should also be observed that there is a connection line 113 that includes a restriction 119 and a non-return valve 118, said line being concerned only when an emergency situation applies during which it is desired to lower the undercarriage in spite of a failure of the hydraulic generator 100. When lowering the undercarriage in an emergency, this line 113 directs the fluid from the annular chamber 20 to the valve 115 which is then in its rest position, with the restriction 119 then making it possible to control the rate at which the undercarriage is lowered. Thus, the valve 115 makes it possible firstly to start up the hydraulic generator 100 under low lead, with this being done while the valve is excited so as to send fluid under pressure to one or other of the chambers 10 and 20 of the actuator, and secondly it allows the undercarriage to be lowered in an emergency when the hydraulic generator 100 has failed, in which case the valve 115 should be at rest, and the first and second pressure relief valves 130 and 140 should naturally be closed.

The various steps in operating the above-described power system are now described, beginning with raising the undercarriage.

When the pilot desires to raise all or part of the undercarriage, the electrically powered pump should be switched on while leaving the valve 115 in its rest or open position so as to enable the electric motor to start up under reduced load. The pilot should then actuates the valve 115 so as to enable the fluid output by the pump generator 100 to feed the annular chamber 20 of the actuator by passing via the line 114 and the branch 121 (and passing through the valve 122 which is in its flow-passing direction).

As mentioned above, the hydraulic generator 100 operates via both a low pressure stage and a high pressure stage so long as the undercarriage is being raised under normal conditions, with the fluid output from the two stages then being combined, or else, under difficult conditions, only the high pressure stage is used which then provides pressure that is higher than that from the low pressure stage. The pressure delivered to the annular chamber 20 increases progressively up to a limit, e.g. $350 \times 10^5$ Pa, set by the pressure relief valve 130, since a higher pressure has the effect of opening said pressure relief valve and of directing fluid to the associated tank 132. In this situation, the electrically controlled valve 125 is at rest, thereby enabling the fluid from the full-section chamber 10 to be directed towards the fluid tank 127. When the piston reaches its end-of-stroke damping position (undercarriage up), i.e. when the orifice 12 is masked, the pressure in the damping chamber 11 begins to increase. As soon as this pressure reaches the corresponding threshold value, the first pressure relief valve 130 is automatically released by its associated control (line 134), thereby causing the pressure in the annular chamber 20 to drop, and in addition, the pressure difference between the damping chamber 11 and the annular chamber 20 is continuously controlled by the second pressure relief valve 140 which is a differential valve and which acts as a pressure limiter. The actuator rod is thus slowed down, and simultaneously a pressure drop is obtained in the damping chamber 11. It is then certain that at the end of raising the undercarriage the actuator rod is not subjected to dangerous compression forces in spite of the effect of the inertia of the undercarriage being raised. Any risk of the actuator rod buckling is thus almost certainly avoided. After the rod has slowed down, the end-of-stroke speed of said rod is given by the previous setting of the restriction 17 that forms a part of the damping means 15. The undercarriage is then automatically locked in its raised position by an associated lock mechanism, and the electrically controlled valve 115 may be released, and the hydraulic generator 100 may be switched off.

The various steps associated with lowering the undercarriage are now described.

To lower the undercarriage, the pilot begins by starting up the hydraulic generator 100, which generator normally operates with both its high pressure stage and its low pressure stage, since the weight of the undercarriage then constitutes a driving force while the undercarriage is being lowered. Nevertheless, in the event of a sticking point, and if the resistance due to the sticking point requires pressure greater than $215 \times 10^5$ Pa, the low pressure stage will be automatically short circuited by the cutout valve 105, so that the hydraulic generator then operates by means of its high pressure stage only, as already explained above. The pilot then actuates the electrically controlled valve 115 and hydraulic fluid begins by passing via the branch 121 to reach the annular chamber 20 of the actuator: under the effect of the pressure that exists in the annular chamber, the actuator rod is retracted again, after which the undercarriage is unlocked. The electrically controlled valve 125 is then excited, thus enabling hydraulic fluid to pass via the branch 123 into the full-section chamber 10. During unlocking, such a sequence makes it possible to avoid pressure peaks in the annular chamber of the actuator during the first instants following unlocking, thereby making it possible to obtain a saving in the dimensions of the actuator cylinder. Pressure then begins to rise in the full-section chamber 10 of the actuator and the undercarriage begins to move down. The rise in pressure in the chamber 10 passing via control line 124 automatically causes the valve 122 to be actuated to take up its closed position. The entire fluid flow then passes via the branch 123 and reaches the full-section chamber of the actuator. As soon as the corresponding pressure threshold is reached, the pressure in the full-section chamber 10 of the actuator likewise releases the pressure relief valve 130 by virtue of the control represented by line 134 (which pressure relief valve then operates as a return safety valve). The release achieved in this way enables the annular chamber 20 of the actuator to communicate with the fluid tank 132.

As mentioned above, the weight of the undercarriage then constitutes a driving load such that the pressure level provided by the pump generator remains relatively low. In any event, the pressure in the full-section chamber remains continuously subjected to control by the presence of the second pressure relief valve 140 which is always controlling the pressure difference that exists between the two chambers of the actuator. Such control makes it possible, in complete safety, to prevent the rod of the actuator being subjected to an excessive overload. The speed at which the undercarriage is lowered is then given by the fluid flow rate delivered by the generator 100. Once the undercarriage has reached its down position, downwards motion is braked by the damping means 25. In the context of this end-of-stroke damping, the pressure in the damping chamber 21 increases, but it is limited by the third pressure relief valve 135. After the rod has slowed down, the end-of-stroke speed is finally given by the previous setting of the associated restriction 27. The undercarriage is automatically locked in its down position by its moving parts including braces coming into alignment. At this moment, the electrically controlled valves 125 and then 115 can be switched off, and the hydraulic generator 100 can be stopped.

In the event of the normal system failing, i.e. if there is a breakdown in the hydraulic generator 100, but providing there is no sticking point, the above-described system still allows the undercarriage to be lowered in an emergency. The electrically controlled valve 115 is then in its rest position, i.e. it allows fluid to pass, such that the fluid from the annular chamber 20 of the actuator can follow the line 113, passing through the non-return valve 118, and the restriction 119, so as to end up in the fluid tank 117 via the valve 115. The restriction 119 then sets the speed at which the undercarriage is lowered, and, as above, the end of the down stroke is controlled by the restriction 27. Once the undercarriage is down, it is locked in position as before by its moving parts bringing braces into alignment.

The invention is not limited to the embodiment described above, but on the contrary covers any variant that uses equivalent means to reproduce the essential characteristics specified above.

I claim:

1. A system for powering an aircraft undercarriage driving actuator, said actuator including a piston and rod assembly defining a full-section chamber and an annular chamber, the system comprising a hydraulic generator capable of delivering fluid under pressure to the annular chamber of the driving actuator to lift the undercarriage, or to the full-section chamber of said actuator to lower the undercarriage, wherein the system includes a safety device for avoiding overloading the rod of the driving actuator under the effect of pressure peaks, said safety device comprising first and second pressure relief valves, said first pressure relief valve fluidically communicating with said annular chamber and a fluid tank for limiting the pressure delivered to the annular chamber while under the control of the pressure that exists in the full-section chamber so as to cause the pressure in said annular chamber to drop when the piston is close to the end of its corresponding stroke, at the lifting as well as the lowering of said undercarriage, by putting said annular chamber into communication with said fluid tank, said second pressure relief valve being of the differential type and continuously controlling the pressure difference between the two chambers of the actuator by allowing fluid to pass automatically as soon as a predetermined pressure difference arises across said second pressure relief valve, and wherein said system further includes an electrically-controlled directional control valve in fluidic communication with the hydraulic generator, said electrically-controlled valve being open when at rest, so as firstly to enable said hydraulic generator to be started up under low load, with said electrically-controlled valve then being excited so as to direct fluid under pressure to one or other of the chambers of the actuator, and secondly to enable the undercarriage to be lowered in an emergency in the event of the hydraulic generator failing, said electrically-controlled valve then being at rest and said first and second pressure relief valves being closed.

2. A power supply system according to claim 1, wherein said first and second pressure relief valves are included in a circuit that further includes first end-of-stroke damping means in fluidic communication with the full-section chamber so that at the end of raising the undercarriage it controls both the slowing down of the rod and the pressure drop in the terminal portion of said full section chamber.

3. A power supply system according to claim 2, wherein the first damping means include a restriction and a non-return valve and serve to control the end-of-stroke speed of the rod after it has slowed down.

4. A power supply system according to claim 2, wherein the circuit also includes second end-of-stroke damping means in fluidic communication with the annular chamber for the purposes at the end of undercarriage lowering both of controlling the slowing down of the rod and of controlling the pressure drop in the end portion of said chamber associated with said annular damping means.

5. A power supply system according to claim 4, wherein the second damping means include a restriction and a non-return valve, and serve to control the end-of-stroke speed of the rod after it has slowed down.

6. A power supply system according to claim 4, wherein a third pressure relief valve is also in fluidic communication with the second damping means in order to limit the pressure existing in the end portion of the annular chamber.

7. A power supply system according to claim 1, further including a line for emergency lowering of the undercarriage by conveying the fluid from the annular chamber to the electrically-controlled valve at rest, and including both a non-return valve and a restriction to control the speed at which the undercarriage is lowered.

* * * * *